(12) United States Patent
Choi et al.

(10) Patent No.: US 10,659,224 B2
(45) Date of Patent: May 19, 2020

(54) APPARATUS AND METHOD FOR PERFORMING OPERATION BEING SECURE AGAINST SIDE CHANNEL ATTACK

(71) Applicant: SAMSUNG SDS CO., LTD., Seoul (KR)

(72) Inventors: Kyu-Young Choi, Seoul (KR); Duk-Jae Moon, Seoul (KR); Hyo-Jin Yoon, Seoul (KR); Ji-Hoon Cho, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 316 days.

(21) Appl. No.: 15/862,803

(22) Filed: Jan. 5, 2018

(65) Prior Publication Data

US 2018/0316498 A1 Nov. 1, 2018

(30) Foreign Application Priority Data

Apr. 28, 2017 (KR) .................. 10-2017-0055700

(51) Int. Cl.
*H04L 9/08* (2006.01)
*H04L 9/32* (2006.01)
(Continued)

(52) U.S. Cl.
CPC ............ *H04L 9/0869* (2013.01); *G06F 7/723* (2013.01); *G06F 7/725* (2013.01); *G06F 21/755* (2017.08);
(Continued)

(58) Field of Classification Search
CPC ..... H04L 9/0869; H04L 9/003; H04L 9/3247; H04L 9/0618; H04L 9/3252;
(Continued)

(56) References Cited

U.S. PATENT DOCUMENTS

2006/0291649 A1* 12/2006 Crandall ................. H04L 9/001
380/46
2013/0016834 A1   1/2013 Gebotys
(Continued)

FOREIGN PATENT DOCUMENTS

| CA | 2262549 C | 6/2001 |
| EP | 2378707 A1 | 10/2011 |
| KR | 10-1586811 B1 | 1/2016 |

OTHER PUBLICATIONS

International Search Report (PCT/ISA/210) dated Jun. 4, 2018 issued by the International Searching Authority in International Application No. PCT/KR2018/001584.
(Continued)

*Primary Examiner* — Joseph P Hirl
*Assistant Examiner* — Thomas A Gyorfi
(74) *Attorney, Agent, or Firm* — Sughrue Mion, PLLC

(57) ABSTRACT

An apparatus and method for performing operation being secure against side channel attack are provided. The apparatus and method generate values equal to values obtained through an exponentiation operation or a scalar multiplication operation of a point using values extracted from previously generated parameter candidate value sets and an operation secure against side-channel attack, thereby improving security against side-channel attack without degrading performance.

21 Claims, 8 Drawing Sheets

(51) Int. Cl.
*H04L 9/06* (2006.01)
*G06F 21/75* (2013.01)
*G06F 7/72* (2006.01)
*H04L 9/00* (2006.01)
*H04L 29/06* (2006.01)

(52) U.S. Cl.
CPC ............ *H04L 9/003* (2013.01); *H04L 9/0618* (2013.01); *H04L 9/3247* (2013.01); *G06F 2207/7219* (2013.01); *H04L 9/3252* (2013.01); *H04L 63/1441* (2013.01)

(58) Field of Classification Search
CPC ....... H04L 63/1441; H04L 9/06; G06F 7/723; G06F 7/725; G06F 21/755; G06F 2207/7219
See application file for complete search history.

(56) References Cited

U.S. PATENT DOCUMENTS

| | | | |
|---|---|---|---|
| 2013/0073873 A1* | 3/2013 | Morioka | H04L 9/003 713/193 |
| 2015/0324611 A1 | 11/2015 | Coric et al. | |
| 2016/0277180 A1 | 9/2016 | Wang et al. | |
| 2017/0033923 A1 | 2/2017 | Melzani | |

OTHER PUBLICATIONS

Written Opinion (PCT/ISA/237) dated Jun. 4, 2018 issued by the International Searching Authority in International Application No. PCT/KR2018/001584.

Communication dated Apr. 18, 2018, from the European Patent Office in counterpart European Application No. 18154413.1.

Victor Boyko et al. "Speeding up Discrete Log and Factoring Based Schemes via Precomputations" ECCV 2016 Conference, Jan. 1, 1998, vol. 1403, (pp. 221-235) XP055461019.

Guiseppe Ateniese et al. "Low-cost Standard Signatures for Energy-Harvesting Wireless Sensor Networks" ACM Transactions on Embedded Computing Systems, Jan. 1, 2015, (24 pages total) XP055463112.

Anonymous "Elliptic curve point multiplication" Mar. 19, 2017, Wikipedia, (6 pages total), URL: https://en.wikipedia.org/w/index.php?title=Elliptic_curve_point_multiplication&oldid=771094462 [retrieved on Mar. 27, 2018] XP055463171.

* cited by examiner

FIG. 2

| | 1 block | 2 block | 3 block | ... | 30 block | 31 block | 32 block |
|---|---|---|---|---|---|---|---|
| 00000000 | $k_{1,1}$ | $k_{1,2}$ | $k_{1,3}$ | ... | $k_{1,30}$ | $k_{1,31}$ | $k_{1,32}$ |
| 00000001 | $k_{2,1}$ | $k_{2,2}$ | $k_{2,3}$ | ... | $k_{2,30}$ | $k_{2,31}$ | $k_{2,32}$ |
| 00000010 | $k_{3,1}$ | $k_{3,2}$ | $k_{3,3}$ | ... | $k_{3,30}$ | $k_{3,31}$ | $k_{3,32}$ |
| ... | ... | ... | ... | ... | ... | ... | ... |
| 11111110 | $k_{255,1}$ | $k_{255,2}$ | $k_{255,3}$ | ... | $k_{255,30}$ | $k_{255,31}$ | $k_{255,32}$ |
| 11111111 | $k_{256,1}$ | $k_{256,2}$ | $k_{256,3}$ | ... | $k_{256,30}$ | $k_{256,31}$ | $k_{256,32}$ |

| | 1 block | 2 block | 3 block | ... | 30 block | 31 block | 32 block |
|---|---|---|---|---|---|---|---|
| 00000000 | $r_{1,1}$ | $r_{1,2}$ | $r_{1,3}$ | ... | $r_{1,30}$ | $r_{1,31}$ | $cr_{1,32}$ |
| 00000001 | $r_{2,1}$ | $r_{2,2}$ | $r_{2,3}$ | ... | $r_{2,30}$ | $r_{2,31}$ | $cr_{2,32}$ |
| 00000010 | $r_{3,1}$ | $r_{3,2}$ | $r_{3,3}$ | ... | $r_{3,30}$ | $r_{3,31}$ | $cr_{3,32}$ |
| ... | ... | ... | ... | ... | ... | ... | ... |
| 11111110 | $r_{255,1}$ | $r_{255,2}$ | $r_{255,3}$ | ... | $r_{255,30}$ | $r_{255,31}$ | $cr_{255,32}$ |
| 11111111 | $r_{256,1}$ | $r_{256,2}$ | $r_{256,3}$ | ... | $r_{256,30}$ | $r_{256,31}$ | $cr_{256,32}$ |

| | 1 block | 2 block | 3 block | ... | 30 block | 31 block | 32 block |
|---|---|---|---|---|---|---|---|
| 00000000 | $cr_{1,1}$ | $cr_{1,2}$ | $cr_{1,3}$ | ... | $cr_{1,30}$ | $cr_{1,31}$ | $cr_{1,32}$ |
| 00000001 | $cr_{2,1}$ | $cr_{2,2}$ | $cr_{2,3}$ | ... | $cr_{2,30}$ | $cr_{2,31}$ | $cr_{2,32}$ |
| 00000010 | $cr_{3,1}$ | $cr_{3,2}$ | $cr_{3,3}$ | ... | $cr_{3,30}$ | $cr_{3,31}$ | $cr_{3,32}$ |
| ... | ... | ... | ... | ... | ... | ... | ... |
| 11111110 | $cr_{255,1}$ | $cr_{255,2}$ | $cr_{255,3}$ | ... | $cr_{255,30}$ | $cr_{255,31}$ | $cr_{255,32}$ |
| 11111111 | $cr_{256,1}$ | $cr_{256,2}$ | $cr_{256,3}$ | ... | $cr_{256,30}$ | $cr_{256,31}$ | $cr_{256,32}$ |

510

APPARATUS AND METHOD FOR PERFORMING OPERATION BEING SECURE AGAINST SIDE CHANNEL ATTACK

CROSS-REFERENCE TO RELATED APPLICATION

This application claims priority from Korean Patent Application No. 10-2017-0055700, filed on Apr. 28, 2017, the disclosure of which is incorporated herein by reference in its entirety.

BACKGROUND

1. Field

The present disclosure relates to a technology for side-channel attack prevention.

2. Discussion of Related Art

As Internet of Things (IoT) devices evolve, there is a growing risk of side-channel attacks that gain important information by exploiting physical information leaked from devices during performance of mathematical computations for a key exchange, an encryption, a digital signature for encryption, etc.

A side-channel attack obtains secret information using a leakage of side-channel information (e.g., power consumption, amount of electromagnetic radiation, algorithm execution time, etc.) for computations performed during an operation of an algorithm for key exchange, encryption, digital signature, etc.

A power analysis attack, which is a form of side-channel attack, is known as the most powerful side-channel attack, and equipment for power analysis attacks is known to be a very effective attack means because of its low cost and high probability of realization. Thus, the power analysis attack is a field in which a lot of research is currently being conducted. A method of such a power analysis attack largely includes simple power analysis (SPA) and differential power analysis (DPA)

For example, an exponentiation operation or a scalar multiplication operation of a point is an essential operation in a related art encryption key exchange scheme, a public key encryption scheme, a digital signature scheme, and the like. In the case of exponentiation (or scalar multiplication) operation, when an exponent value is expressed as a bit string, a square operation and a multiplication operation are performed when each bit in the bit string is 1, and only the multiplication operation is performed when each of the bits in the bit string is 0.

The power analysis attack exploits the different power consumption requirements for the different operations performed in the case in which each bit value is 1 and in the case in which each of the bit values is 0. That is, since the power consumption for the square operation and the subsequent multiplication operation in the case in which bit value is 1 is large and the power consumption in the case in which the bit value is 0 is small, it is possible to obtain a secret value (a secret key or the like) by taking information on an exponent value, which is the secret value, through an analysis of power consumption occurring at a time of an exponentiation computation.

Related art methods for preventing such side-channel attacks are methods for protecting against only some side-channel attacks, However, a method to secure against all of the side-channel attacks has not be proposed. In addition, related art methods for preventing side-channel attacks have a problem in that they require a large amount of computation and thus cause performance degradation and time delay during generation of digital signature.

SUMMARY

According to an aspect of an exemplary embodiment, there is provided an apparatus comprising: a processor configured to execute: a seed value generator configured to generate a seed value; a divider configured to divide the seed value into a plurality of blocks; a first extractor configured to extract a plurality of first parameter values from a first parameter candidate value set comprising a plurality of first parameter candidate values, each of the plurality of first parameter values respectively corresponding to one of the plurality of blocks divided from the seed value; a second extractor configured to extract a plurality of second parameter values from a second parameter candidate value set comprising a plurality of second parameter candidate values generated based on the plurality of first parameter candidate values included in the first parameter candidate value set, each of the plurality of second parameter values respectively corresponding to one of the plurality of blocks divided from the seed value; and a calculator configured to generate a first random number based on the plurality of first parameter values, generate a second random number by performing an exponentiation operation based on the first random number as an exponent or performing a scalar multiplication operation of a point based on the first random number as a scalar multiplier, and generate a third random number based on the plurality of second parameter values, wherein the processor is further configured to encrypt data or generate a digital signature for the data based on at least one of the first random number, the second random number, and the third random number.

Each of the plurality of second parameter candidate values included in the second parameter candidate value set may be generated by performing an exponentiation operation using a corresponding one of the plurality of first parameter candidate values included in the first parameter candidate value set as an exponent or by performing a scalar multiplication operation of a point using a corresponding one of the plurality of first parameter candidate values included in the first parameter candidate value set as a scalar multiplier.

The first extractor may be further configured to extract the plurality of first parameter values respectively corresponding to bit strings of the plurality of blocks divided from the seed value and positions of the blocks in the seed value from the first parameter candidate value set, and the second extractor may be further configured to extract the plurality of second parameter values respectively corresponding to bit strings in the plurality of blocks divided from the seed value and positions of the blocks in the seed value from the second parameter candidate value set.

The calculator may generate the first random number by adding the plurality of first parameter values with each other.

At least one of the second parameter candidate values included in the second parameter candidate value set may include a value resulting from multiplying one of the plurality of first parameter candidate values by a secret key.

The third random number may be equal to a product of the secret key and the second random number.

The processor may be further configured to encrypt the data or generate the digital signature for the data based on the first random number, the second random number, and the third random number.

The seed value may comprise a random bit string.

The number of the plurality of first parameter candidate values included in the first parameter candidate value set may be changeable according to a length of the seed value and a number of blocks.

According to another aspect of an exemplary embodiment, there is provided a method, comprising: generating a seed value; dividing the seed value into a plurality of blocks; extracting a plurality of first parameter values from a first parameter candidate value set comprising a plurality of first parameter candidate values, each of the plurality of first parameter values respectively corresponding to one of the plurality of blocks divided from the seed value; extracting a plurality of second parameter values from a second parameter candidate value set comprising a plurality of second parameter candidate values generated based on the plurality of first parameter candidate values included in the first parameter candidate value set, each of the plurality of second parameter values respectively corresponding to one of the plurality of blocks divided from the seed value; generating a first random number based on the plurality of first parameter values; generating a second random number by performing an exponentiation operation using the first random number as an exponent or by performing a scalar multiplication operation of a point using the first random number as a scalar multiplier; generating a third random number based on the plurality of second parameter values; and encrypting data or generating a digital signature for the data based on at least one of the first random number, the second random number, and the third random number.

Each of the plurality of second parameter candidate values included in the second parameter candidate value set may be generated by performing an exponentiation operation using a corresponding one of the plurality of first parameter candidate values included in the first parameter candidate value set as an exponent or by performing a scalar multiplication operation of a point using a corresponding one of the plurality of first parameter candidate values included in the first parameter candidate value set as a scalar multiplier.

The extracting of the plurality of first parameter values may extract the plurality of first parameter values respectively corresponding to bit strings of the plurality of blocks divided from the seed value and positions of the blocks in the seed value from the first parameter candidate value set, and the extracting the plurality of second parameter values may extract the plurality of second parameter values respectively corresponding to bit strings in the plurality of blocks divided from the seed value and positions of the blocks in the seed value from the second parameter candidate value set.

The generating of the first random number generates the first random number by adding the plurality of first parameter values with each other.

At least one of the second parameter candidate values included in the second parameter candidate value set may include a value resulting from multiplying one of the plurality of first parameter candidate values by a secret key.

The third random number may be equal to a product of the secret key and the second random number.

The encrypting the data or the generating the digital signature for the data may be based on at least one of the first random number, the second random number, and the third random number.

The seed value may comprise a random bit string.

The number of the plurality of first parameter candidate values included in the first parameter candidate value set may be changeable according to a length of the seed value and a number of blocks.

According to an aspect of an exemplary embodiment, there is provided a non-transitory computer readable medium having stored thereon a program for causing a computer to execute a method, comprising: generating a seed value; dividing the seed value into a plurality of blocks; extracting a plurality of first parameter values from a first parameter candidate value set comprising a plurality of first parameter candidate values, each of the plurality of first parameter values respectively corresponding to one of the plurality of blocks divided from the seed value; extracting a plurality of second parameter values from a second parameter candidate value set comprising a plurality of second parameter candidate values generated based on the plurality of first parameter values included in the first parameter candidate value set, each of the plurality of second parameter values respectively corresponding to one of the plurality of blocks divided from the seed value; generating a first random number based on the plurality of first parameter values; generating a second random number by performing an exponentiation operation using the first random number as an exponent or by performing a scalar multiplication operation of a point using the first random number as a scalar multiplier; generating a third random number based on the plurality of second parameter values; and encrypting data or generating a digital signature for the data based on at least one of the first random number, the second random number, and the third random number.

According to an aspect of an exemplary embodiment, there is provided an apparatus comprising: a processor configured to: receive a seed value; divide the seed value into a plurality of blocks; extract, for each of the plurality of blocks, a first parameter value from a first parameter candidate value set comprising a plurality of first parameter candidate values, by using a number of the respective block and a value in the respective block as a first index; extract, for each of the plurality of blocks, a second parameter value from a second parameter candidate value set comprising a plurality of second parameter candidate values generated based on the plurality of first parameter candidate values, by using a number of the respective block and a value in the respective block as a second index, the plurality of second parameter values; generate a first random number based the first parameter values for each of the plurality of blocks; generate a second random number by performing one of an exponentiation operation based on the first random number as an exponent or a scalar multiplication operation of a point based on the first random number as a scalar multiplier; generate a third random number based on the second parameter values; for each of the plurality of blocks; and apply at least one of the first random number, the second random number, and the third random number to encrypt data or generate a digital signature for the data.

A number of the first parameter candidate values included in the first parameter candidate value set or a number of the second parameter candidate values included in the second parameter candidate value set may change according to a length of the seed value and a total number of the plurality of blocks.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which:

FIG. 2 is a table showing one example of a first parameter candidate value set according to an exemplary embodiment of the present disclosure;

FIG. 4 is a table showing an example of a second parameter candidate value set according to an exemplary embodiment of the present disclosure;

FIG. 5 is a table showing another example of the second parameter candidate value set according to an exemplary embodiment of the present disclosure;

DETAILED DESCRIPTION OF EXEMPLARY EMBODIMENTS

Hereinafter, detailed exemplary embodiments of the present disclosure will be described with reference to the accompanying drawings. The following detailed description is provided for a more comprehensive understanding of methods, devices and/or systems described in this specification. However, the methods, devices, and/or systems are only examples, and the present disclosure is not limited thereto.

In the description of the present disclosure, detailed descriptions of related well-known functions that are determined to unnecessarily obscure the gist of the present disclosure will be omitted. Some terms described below are defined in consideration of functions thereof in the present disclosure, and meanings thereof may vary depending on, for example, a user or operator's intention or custom. Therefore, the meanings of terms should be interpreted on the basis of the scope throughout this specification. The terminology used in the detailed description is provided only to describe exemplary embodiments of the present disclosure and not for purposes of limitation. Unless the context clearly indicates otherwise, the singular forms include the plural forms. It should be understood that the terms "comprises" or "includes," when used herein, specify the presence of some features, numbers, steps, operations, elements, and/or combinations thereof, but do not preclude the presence or possibility of addition of one or more other features, numbers, steps, operations, elements, and/or combinations thereof.

Figure 1:
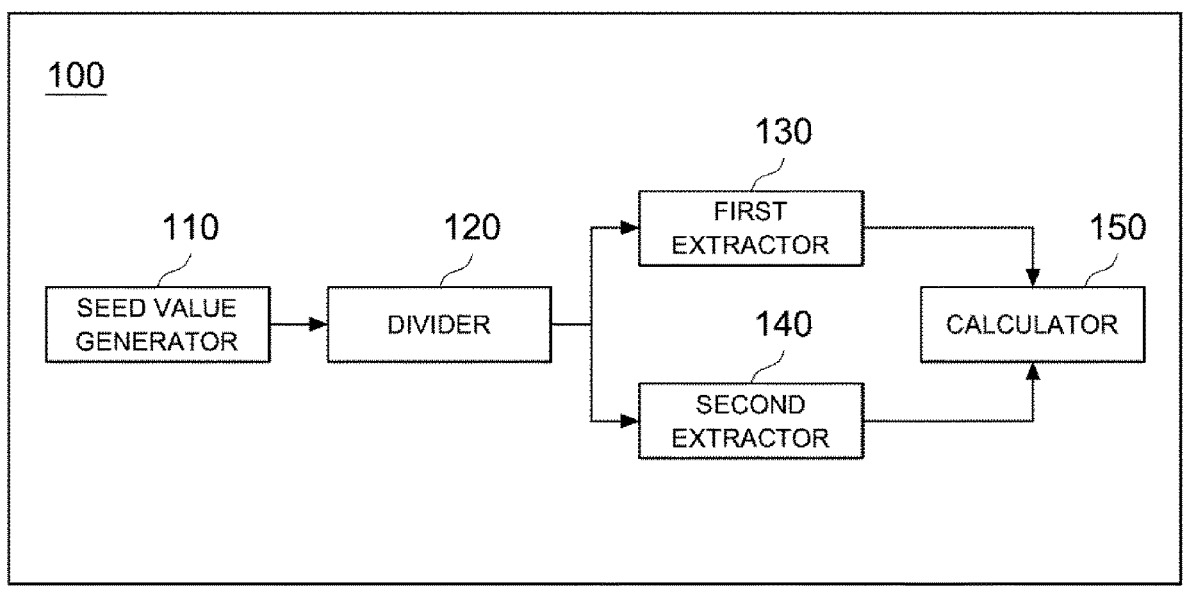
FIG. 1 is a configuration diagram illustrating a computation apparatus according to an exemplary embodiment of the present disclosure.

FIG. 1 is a configuration diagram illustrating a computation apparatus according to an exemplary embodiment of the present disclosure.

Referring to FIG. 1, a computation apparatus 100 includes a seed value generator 110, a divider 120, a first extractor 130, a second extractor 140, and a calculator 150.

The seed value generator 110 generates a seed value. According to an exemplary embodiment, the seed value may be formed by a random bit string.

In this case, the seed value generator 110 may generate the seed value, for example, by sequentially generating arbitrary bit values.

In another example, the seed value generator 110 may generate the seed value by converting an ID obtained from an external device into an arbitrary bit string. In this case, a hash function, for example, SHA-256, may be used to convert the obtained ID into the arbitrary bit string.

However, a seed value generation method of the seed value generator 110 is not particularly limited, and the seed value generator 110 may generate the seed value using various known methods capable of generating a sequence of arbitrary bits of a predetermined length.

The divider 120 divides the seed value generated by the seed value generator 110 into a plurality of blocks.

Specifically, according to an exemplary embodiment of the present disclosure, the divider 120 may divide the seed value by a predetermined size to generate the plurality of blocks. In this case, the number of blocks generated by the divider 120 may be changed according to an exemplary embodiment.

For example, when the seed value generated by the seed value generator 110 is a bit string with a length of 256 bits, the divider 120 may divide the seed value into units of 8 bits to generate 32 blocks.

The first extractor 130 extracts a plurality of first parameter values that respectively correspond to the plurality of blocks generated by the divider 120 from a first parameter candidate value set including a plurality of first parameter candidate values.

In this case, the plurality of first parameter candidate values included in the first parameter candidate value set may be random values generated in advance and stored in a storage.

According to an exemplary embodiment of the present disclosure, the first parameter candidate value set may include $2^n \times m$ first parameter candidate values. Here, m represents the number of blocks generated by the divider 120, and n represents a length of a bit string included in each of the generated blocks. Moreover, the number of the first parameter candidate values included in the first parameter candidate value set may be changed according to the length of the seed value generated by the seed value generator 110 and the number of blocks generated by the divider 120.

According to an exemplary embodiment of the present disclosure, the first extractor 130 may extract first parameter values respectively corresponding to bit strings in the plurality of blocks generated by the divider 120 and positions of the blocks in the seed value from the first parameter candidate value set.

Specifically, each of the first parameter candidate values included in the first parameter candidate value set may be indexed to one of $2^n$ different bit strings, each having a length of n bits, and a position of a block including the one of $2^n$ different bit string in the seed value. Accordingly, the first extractor 130 may compare the bit string included in each of the blocks generated by the divider 120 and the position of each of the blocks generated by the divider 120 in the seed value with an index value of each of the first parameter candidate values included in the first parameter candidate value set to extract a corresponding first parameter candidate value as a first parameter value.

FIG. 2 is a table showing one example of the first parameter candidate value set according to an exemplary embodiment of the present disclosure.

In the example shown in FIG. 2, a seed value generated by the seed value generator 110 has a length of 256 bits and that the divider 120 divides the seed value into 32 blocks, each having a length of 8 bits. Thus, a first parameter candidate value set 210 shown in FIG. 2 includes $2^8 \times 32$ first parameter candidate values.

Meanwhile, each of the first parameter candidate values included in the first parameter candidate value set 210 corresponds to one of 256 bit strings, each having a length of 8 bits, and a position of a block including a corresponding bit string in the seed value.

Specifically, $k_{1,1}$ is a first parameter candidate value indexed to a bit string of 00000000 and the first block (i.e., 1 block) in the seed value, and $k_{256,32}$ is a first parameter candidate value indexed to a bit string of 11111111 and the $32^{nd}$ block (i.e., 32 block) in the seed value.

Figure 3:
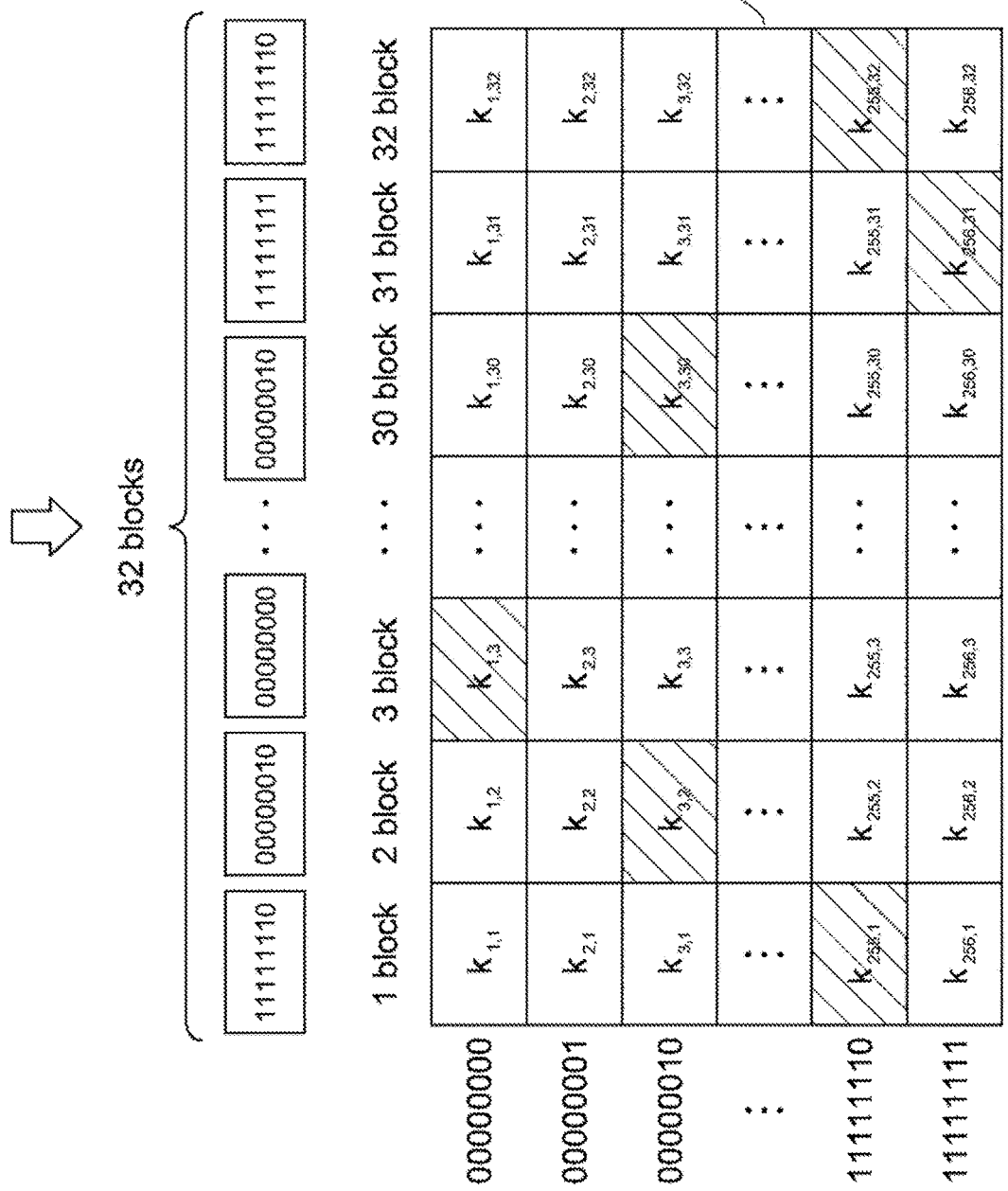
FIG. 3 is a diagram illustrating an example of an extraction of the first parameter value according to an exemplary embodiment of the present disclosure.

FIG. 3 is a diagram illustrating an example of an extraction of the first parameter value according to an exemplary embodiment of the present disclosure.

In the example shown in FIG. 3, a seed value 310 generated by the seed value generator 110 has a length of 256 bits and the divider 120 divides the seed value 310 into 32 blocks, each having a length of 8 bits. In addition, a first parameter candidate value set 330 may be same as the first parameter candidate value set 210 shown in FIG. 2. However, according to another embodiment, the first parameter candidate value set may be different from the first parameter candidate value set 210 shown in FIG. 2.

In the example shown in FIG. 3, when a bit string included in a first block among the 32 blocks generated by dividing the seed value 310 is "1111110," the first extractor 130 may extract a first parameter candidate value $k_{255,1}$ that corresponds to "1 block" and the bit string of "1111110" from the first parameter candidate value set 330 as a first parameter value corresponding to the first block.

Further, when a bit string included in a second block among the 32 blocks generated by dividing the seed value 310 is "00000010," the first extractor 130 may extract a first parameter candidate value $k_{3,2}$ that corresponds to "2 block" and the bit string of "00000010" from the first parameter candidate value set 330 as a first parameter value corresponding to the second block.

In the same way, the first extractor 130 may extract first parameter values that respectively correspond to all of the 32 blocks, which are generated by dividing the seed value 310, from the first parameter candidate value set 330.

Accordingly, $\{k_{255,1}, k_{3,2}, k_{1,3}, \ldots, k_{3,30}, k_{256,31}, k_{255,32}\}$ are obtained as the first parameter values extracted by the first extractor 130 in the example shown in FIG. 3.

Referring back to FIG. 1, the second extractor 140 extracts a plurality of second parameter values that respectively correspond to the plurality of blocks generated by the divider 120 from a second parameter candidate value set including a plurality of second parameter candidate values generated by using each of the plurality of first parameter candidate values included in the first parameter candidate value set.

In this case, according to an exemplary embodiment of the present disclosure, second parameter candidate values ($r_{i,j}$) included in the second parameter candidate value set may be generated by performing, for example, an exponentiation operation using each of first parameter candidate values ($k_{i,j}$) included in the first parameter candidate value set, as shown in the following Equation 1, or by performing a scalar multiplication operation of a point using each of the first parameter candidate values (10 included in the first parameter candidate value set, as shown in the following Equations 2 and 3.

$$r_{i,j} = g^{k_{i,j}} \bmod p \quad \text{[Equation 1]}$$

In Equation 1, p represents an arbitrary prime number and g represents a generator of a multiplicative group having p as an order.

$$k_{i,j} \cdot P = (x_{i,j}, y_{i,j}) \quad \text{[Equation 2]}$$

$$r_{i,j} = x_{i,j} \bmod p \quad \text{[Equation 3]}$$

In Equations 2 and 3, p represents an arbitrary prime number and P represents a generator of an additive group having p as an order.

In addition, at least some of the second parameter candidate values included in the second parameter candidate value set may include a value multiplied by a secret key used for encryption of data or digital signature generation associated with the data.

Specifically, some of the second parameter candidate values included in the second parameter candidate value set may be, for example, values obtained by multiplying each value that is obtained through an exponentiation operation or a scalar multiplication operation of a point using some of the first parameter candidate values included in the first parameter candidate value set, by the secret key.

In another example, some of the second parameter candidate values included in the second parameter candidate value set may be values obtained by performing an exponentiation operation or a scalar multiplication operation of a point using each of some of the first parameter candidate values included in the first parameter candidate value set. In this case, the remaining second parameter candidate values included in the second parameter candidate value set may be values obtained by multiplying each value, which is obtained by performing an exponentiation operation or a scalar multiplication operation of a point using each of the remaining first parameter candidate values included in the first parameter candidate value set by the secret key.

Meanwhile, in an exemplary embodiment, the second parameter candidate value set may include $2^n \times m$ second parameter candidate values. That is, the number of the second parameter candidate values included in the second parameter candidate value set may be changed according to the length of the seed value generated by the seed value generator 110 and the number of blocks generated by the divider 120.

Meanwhile, according to an exemplary embodiment, the second extractor 140 may extract second parameter values respectively corresponding to bit strings of the plurality of blocks generated by the divider 120 and positions of the blocks in the seed value from the second parameter candidate value set.

Specifically, each of the second parameter candidate values included in the second parameter candidate value set may be indexed to one of $2^n$ different bit strings, each having a length of n bits, and a position of a block including the one of $2^n$ different bit string in the seed value. Accordingly, the second extractor 140 may compare the bit string included in each of the blocks generated by the divider 120 and the position of each of the blocks generated by the divider 120 in the seed value with an index value of each of the second parameter candidate values included in the second parameter candidate value set to extract a corresponding second parameter candidate value as a second parameter value.

FIG. 4 is a table showing an example of a second parameter candidate value set according to an exemplary embodiment of the present disclosure.

Specifically, FIG. 4 shows an example of the second parameter candidate value set including second parameter candidate values generated from the first parameter candidate values included in the first parameter candidate value set 210 shown in FIG. 2.

Referring to FIG. 4, a second parameter candidate value set 410 includes the same number (i.e., $2^8 \times 32$) of second parameter candidate values as the number of first parameter candidate values included in the first parameter candidate value set 210 shown in FIG. 2.

In addition, the second parameter candidate values included in the second parameter candidate value set 410 are each indexed using one of 32 blocks and one of different bit strings, each having a length of 8 bits. In this case, each of the second parameter candidate values included in the second parameter candidate value set 410 may have the same index value as that of a corresponding first parameter candidate value included in the first parameter candidate value set 210.

Specifically, a second parameter candidate value $r_{1,1}$ is a value generated using the first parameter candidate value $k_{1,1}$ included in the first parameter candidate value set 210, and is indexed to a bit string of "00000000" and the first block (i.e., 1 block) in the same way as the first parameter candidate value $k_{1,1}$.

In addition, a second parameter candidate value $cr_{1,32}$ is a value generated using a first parameter candidate value $k_{1,32}$ included in the first parameter candidate value set 210, and is indexed to a bit string of "00000000" and the $32^{nd}$ block (i.e., 32 block) in the same way as the first parameter candidate value $k_{1,32}$.

Meanwhile, except for second parameter candidate values (i.e., $cr_{1,32}$, $cr_{2,32}$, $cr_{3,32}$, . . . , $cr_{255,32}$, $cr_{256,32}$) having "32 block" as index values in the second parameter candidate value set 410, the remaining second parameter candidate values in the second parameter candidate value set 410 may have values equal to values obtained by being generated through an exponentiation operation using each first parameter candidate value of the first parameter candidate value set 210 that has the same index value as the second parameter candidate values.

However, according to an exemplary embodiment, the second parameter candidate values (i.e., $cr_{1,32}$, $cr_{2,32}$, $cr_{3,32}$, . . . , $cr_{255,32}$, $cr_{256,32}$) having "32 block" as index values in the second parameter candidate value set 410 have values equal to values obtained by multiplying each of values obtained through an exponentiation operation using each of the first parameter candidate values (i.e., $k_{1,32}$, $k_{2,32}$, $k_{3,32}$, . . . , $k_{255,32}$, $k_{256,32}$) in the first parameter candidate value set 210 that have the same index values as the second parameter candidate values by a secret key c.

Meanwhile, in the example shown in FIG. 4, the second parameter candidate values (i.e., $cr_{1,32}$, $cr_{2,32}$, $cr_{3,32}$, . . . , $cr_{255,32}$, $cr_{256,32}$) having "32 block" as index values are shown as having the values generated by multiplying each of the first parameter candidate values (i.e., $r_{1,32}$, $r_{2,32}$, $r_{3,32}$, . . . , $r_{255,32}$, $r_{256,32}$) having the same index values as the second parameter candidate values by the secret key c, but the second parameter candidate values are not limited thereto. Specifically, second parameter candidate values included in the second parameter candidate value set which have a specific block as their index values may have values equal to values obtained by multiplying each first parameter candidate value having an identical block as an index values by the secret key c.

FIG. 5 is a table showing another example of the second parameter candidate value set according to an exemplary embodiment of the present disclosure.

Specifically, FIG. 5 shows an example of the second parameter candidate value set including second parameter candidate values generated from the first parameter candidate values contained in the first parameter candidate value set 210 shown in FIG. 2.

Referring to FIG. 5, a second parameter candidate value set 510 includes the same number (i.e., $2^8 \times 32$) of second parameter candidate values as the number of first parameter candidate values included in the first parameter candidate value set 210 shown in FIG. 2.

In addition, the second parameter candidate values included in the second parameter candidate value set 510 are each indexed using one of 32 blocks and one of different bit strings, each having a length of 8 bits. In this case, each of the second parameter candidate values included in the second parameter candidate value set 510 has the same index value as that of a corresponding first parameter candidate value included in the first parameter candidate value set 210.

Specifically, a second parameter candidate value $cr_{1,1}$ is a value generated using the first parameter candidate value $k_{1,1}$ included in the first parameter candidate value set 210 and is indexed to the bit string of "00000000" and the first block (i.e., 1 block) in the same way as the first parameter candidate value $k_{1,1}$.

In addition, the second parameter candidate value $cr_{1,32}$ is a second parameter candidate value generated using the first parameter candidate value $k_{1,32}$ in the first parameter candidate value set 210 and is indexed to the bit string of "00000000" and the $32^{nd}$ block (i.e., 32 block) in the same way as the first parameter candidate value $k_{1,32}$.

Meanwhile, the second parameter candidate values included in the second parameter candidate value set 510 have values equal to values obtained by multiplying values, which are generated through a scalar multiplication operation of a point using each of the first parameter candidate values having the same index values as those of the second parameter candidate values in the first parameter candidate value set 210, by the secret key c.

Figure 6:
FIG. 6 is a diagram illustrating one example of an extraction of the second parameter value according to an exemplary embodiment of the present disclosure.

FIG. 6 is a diagram illustrating one example of the extraction of the second parameter value according to an exemplary embodiment of the present disclosure.

In the example shown in FIG. 6, a seed value 610 is the same as the seed values 310 shown in FIG. 3 and that the divider 120 divides the seed value 610 into 32 blocks, each having a length of 8 bits. In addition, a second parameter candidate value set 630 is the same as the second parameter candidate value set 410 shown in FIG. 4.

In the example shown in FIG. 6, when a bit string included in a first block of the 32 blocks generated by dividing the seed value 610 is "1111110," the second extractor 140 may extract a second parameter candidate value $r_{255,1}$ that corresponds to "1 block" and the bit string of "1111110" from the second parameter candidate value set 630 as a second parameter value corresponding to the first block.

In addition, when a bit string included in a second block of the blocks generated by dividing the seed value 610 is "00000010," the second extractor 140 may extract a second parameter candidate value $r_{3,2}$ that corresponds to "2 block" and the bit string of "00000010" from the second parameter candidate value set 630 as a second parameter value corresponding to the second block.

In the same way, the second extractor 140 may extract second parameter values that respectively correspond to the 32 blocks generated by dividing the seed value 610 from the second parameter candidate value set 630.

Accordingly, $\{r_{255,1}, r_{3,2}, r_{1,3}, \ldots, r_{3,30}, r_{256,31}, cr_{255,32}\}$ are obtained as the second parameter values extracted by the second extractor 140 in the example shown in FIG. 6.

Figure 7:
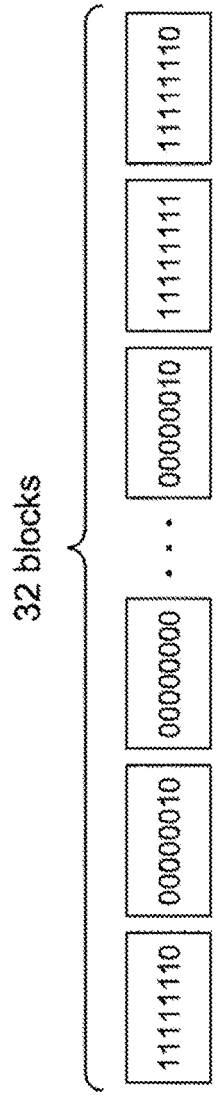
FIG. 7 is a diagram illustrating another example of the extraction of the second parameter value according to an exemplary embodiment of the present disclosure.

FIG. 7 is a diagram illustrating another example of the extraction of the second parameter value according to an exemplary embodiment of the present disclosure.

In the example shown in FIG. 7, a seed value 710 is the same as the seed value 310 shown in FIG. 3 and that the divider 120 divides the seed value 710 into 32 blocks, each having a length of 8 bits. In addition, a second parameter candidate value set 730 is the same as the first parameter candidate value set 510 shown in FIG. 5.

In the example shown in FIG. 7, when a bit string included in the first block of the 32 blocks generated by dividing the seed value 710 is "1111110," the second extractor 140 may extract a second parameter candidate value $cr_{255,1}$ that corresponds to "1 block" and the bit string of "1111110" from the second parameter candidate value set 730 as a second parameter value corresponding to the first block.

In addition, when a bit string included in the second block of the blocks generated by dividing the seed value 710 is "00000010," the second extractor 140 may extract a second parameter candidate value $cr_{3,2}$ that corresponds to "2 block" and the bit string of "00000010" from the second parameter candidate value set 730 as a second parameter value corresponding to the second block.

In the same way, the second extractor 140 may extract parameter values that respectively correspond to the 32 blocks generated by dividing the seed value 710 from the second parameter candidate value set 730.

Accordingly, $\{cr_{255,1}, cr_{3,2}, cr_{1,3}, \ldots, cr_{3,30}, cr_{256,31}, cr_{255,32}\}$ are obtained as the second parameter values extracted by the second extractor 140 in the example shown in FIG. 7.

Referring back to FIG. 1, the calculator 150 generates a first random number using the first parameter values extracted by the first extractor 130.

In this case, according to an exemplary embodiment of the present disclosure, the calculator 150 may generate the first random number by adding the first parameter values extracted from the first parameter candidate value set with each other. For example, the calculator 150 may use the following Equation 4 to generate a first random number k from the first parameter values extracted in the example shown in FIG. 3.

$$k = k_{255,1} + k_{3,2} + k_{1,3} + \ldots + k_{3,30} + k_{256,31} + k_{255,32} \quad \text{[Equation 4]}$$

Meanwhile the calculator 150 may generate the first random number k using various types of one-way function other than the foregoing Equation 4.

In addition, the calculator 150 may generate a second random number by performing an exponentiation operation using the first random number as an exponent or by performing a scalar multiplication operation of a point using the first random number as a scalar multiplier.

For example, the calculator 150 may use the following Equation 5 to generate a second random number r from the first random number k.

$$r = g^k \bmod p \quad \text{[Equation 5]}$$

In Equation 5, p is an arbitrary prime number and g is a generator of a multiplicative group having p as an order.

In another example, the calculator 150 may use the following Equations 6 and 7 to generate the second random number r from the first random number k.

$$k \cdot P = (x, y) \quad \text{[Equation 6]}$$

$$r = x \bmod p \quad \text{[Equation 7]}$$

In Equations 6 and 7, p is an arbitrary prime number and P is a generator of an additive group having p as an order.

Meanwhile, the calculator 150 may generate a third random number using the second parameter values extracted from the second parameter candidate value set.

Specifically, according to an exemplary embodiment of the present disclosure, the calculator 150 may generate the third random number by multiplying or adding the second parameter values extracted from the second parameter candidate value set with each other.

For example, the calculator 150 may use the following Equation 8 to generate a third random number cr from the second parameter values extracted in the example shown in FIG. 6.

$$cr = r_{255,1} \times r_{3,2} \times r_{1,3} \times \ldots \times r_{3,30} \times r_{256,31} \times cr_{255,32} \quad \text{[Equation 8]}$$

In another example, the calculator 150 may use the following Equation 9 to generate the third random number cr from the second parameter values extracted in the example shown in FIG. 7.

$$cr = cr_{255,1} + cr_{3,2} + cr_{1,3} + \ldots + cr_{3,30} + cr_{256,31} + cr_{255,32} \quad \text{[Equation 9]}$$

That is, the third random number cr generated by the calculator 150 is equal to a product of the secret key c multiplied by the second random number r.

According to another exemplary embodiment, the calculator 150 may generate the third random number cr from the second parameter values using various forms of one-way function, capable of generating a value equal to the second random number r multiplied by the secret key c, other than the addition or multiplication of the second parameter values, as shown in the foregoing Equation 4 and Equation 6.

Meanwhile, according to an exemplary embodiment of the present disclosure, the one or more processors of the computing device 100 may encrypt data or generate a digital signature using the generated first random number k, second random number r, and third random number cr. According to exemplary embodiment, the calculator 150 may encrypt data or generate a digital signature using the generated first random number k, second random number r, and third random number cr. According to another exemplary embodiment, another component or another element of the one or more processors of the computing device 100 may encrypt data or generate a digital signature using the generated first random number k, second random number r, and third random number cr.

Specifically, the calculator 150 may encrypt data or generate a digital signature using various types of encryption algorithm or digital signature generation algorithm which require an exponentiation operation or a scalar multiplication operation of a point, and an operation of multiplying a value generated through the exponentiation operation or the scalar multiplication operation of a point by a secret key for encryption or digital signature generation. In this manner, according to an exemplary embodiment, since a direct exponentiation operation or a direct scalar multiplication operation of a point is not performed for a key exchange, an encryption, or a digital signature for encryption, exploitation of physical information leaked from devices by side-channel attacks during performance of mathematical computations is prevented.

For example, the calculator 150 may generate a digital signature using a digital signature algorithm (DSA), which is one digital signature scheme.

Specifically, a digital signature according to the DSA is generated as follows:

1) A random integer k is selected ($k \in [1, q-1]$)
2) $r = (g^k \mod p) \mod q$ is computed (where p is an arbitrary prime number, q is a prime divisor of p−1, and g is a generator of a multiplicative group having p as an order)
3) $s = k^{-1}(H(m) + cr) \mod q$ is computed (where c is a secret key, m is a message, and H( ) is a hash function)
4) A signature value (r,s) is output for a message In this case, the calculator 150 may use the first random number as a random integer k and use the second random number as the signature value r. In addition, the calculator 150 may use the third random number cr to generate the signature value s. That is, the third random number cr for generating the signature value s may be obtained through another operation, such as a multiplication operation, which is secure against side-channel attack and uses the second parameter values extracted from the second parameter candidate value set, rather than through an operation by multiplying the signature value r by the secret key c. Therefore, the secret key c used to generate the signature value s is not exposed by a side-channel attack.

In another example, the calculator 150 may generate a digital signature using an elliptic curve digital signature algorithm (ECDSA), which is one digital signature scheme.

Specifically, a digital signature according to the ECDSA is generated as follows:

1) A random integer k ($k \in [1, q-1]$) is selected (where q is a prime divisor of p−1 and p is an arbitrary prime number)
2) $k \cdot P = (x, y)$ is computed (where P is a generator of an additive group having p as an order)
3) $r = x \mod p$ is computed
4) $s = k^{-1}(H(m) + cr) \mod (p-1)$ is computed (where c is a secret key, m is a message, and H( ) is a hash function)
5) A signature value (r,s) is output for a message In this case, the calculator 150 may use the first random number as the random integer k, and use the second random number as the signature value r. In addition, the calculator 150 may use the third random number cr to generate the signature value s. That is, the third random number cr used to generate the signature value s may be obtained through an operation, such as an addition operation, which is secure against side-channel attack and uses the second parameter values extracted from the second parameter candidate value set, rather than through the operation of multiplying the signature value r by the secret key c. Therefore, the secret key c used to generate the signature value s is not exposed by a side-channel attack.

Meanwhile, in an exemplary embodiment, the seed value generator 110, the divider 120, the first extractor 130, the second extractor 140, and the calculator 150, which are shown in FIG. 1, may be implemented on one or more computing devices including one or more processors and a computer-readable recording medium connected to the one or more processors. The computer-readable recording medium may be provided inside or outside the processor, and may be connected to the processor by various well-known means. The processor in the computing device may enable the computing device to operate according to the exemplary embodiments described in the specification. For example, the processor may execute instructions stored in the computer readable recording medium, and the instructions stored in the computer readable recording medium, when executed by the processor, may cause a series of operational steps to be performed on the computing device according to the exemplary embodiments of the present disclosure described in the specification.

Figure 8:
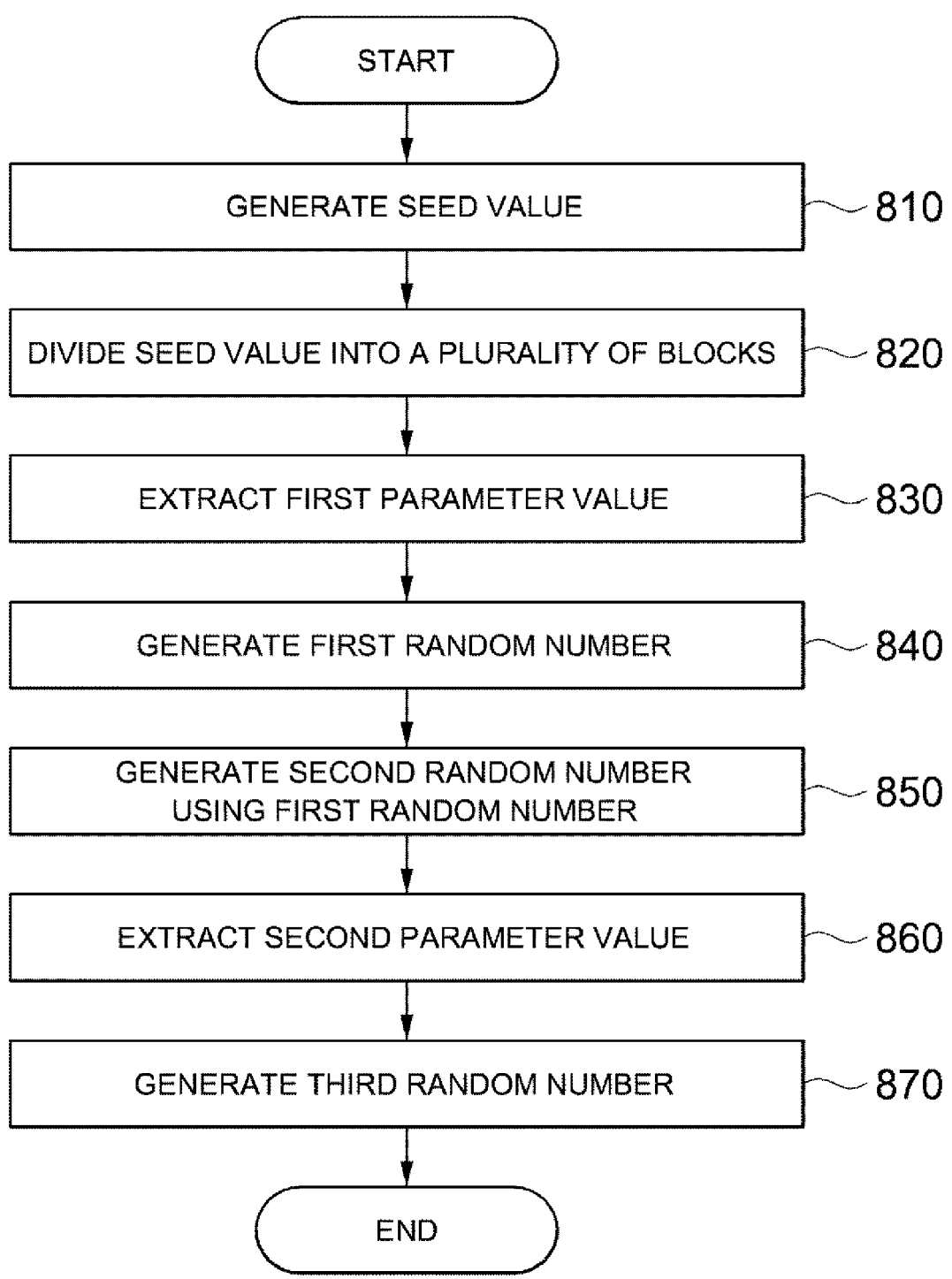
FIG. 8 is a flowchart illustrating a computation method according to an exemplary embodiment of the present disclosure.

FIG. 8 is a flowchart illustrating a computation method according to an exemplary embodiment of the present disclosure.

The computation method shown in FIG. 8 may be performed by the computation apparatus 100 illustrated in FIG. 1.

Referring to FIG. 8, the computation apparatus 100 generates a seed value formed by a random bit string (810).

Then, the computation apparatus 100 divides the generated seed value into a plurality of blocks (820).

The computation apparatus 100 extracts a plurality of first parameter values that respectively correspond to the plurality of generated blocks from a first parameter candidate value set including a plurality of first parameter candidate values (830).

In this case, according to an exemplary embodiment of the present disclosure, the computation apparatus 100 may extract first parameter values respectively corresponding to bit strings in the plurality of generated blocks and positions of the blocks in the seed value from the first parameter candidate value set.

Thereafter, the computation apparatus 100 generates a first random number from the first parameter values (840).

In this case, according to an exemplary embodiment of the present disclosure, the computation apparatus 100 may generate the first random number by adding the first parameter values with each other.

Then, the computation apparatus 100 generates a second random number using the generated first random number (850).

In this case, according to an exemplary embodiment of the present disclosure, the computation apparatus 100 may generate the second random number through an exponentiation operation using the first random number as an exponent or through a scalar multiplication operation of a point using the first random number as a scalar multiplier.

Then, the computation apparatus 100 extracts a plurality of second parameter values that respectively correspond to the plurality of generated blocks from a second parameter candidate value set including a plurality of second parameter candidate values generated using each of a plurality of first parameter candidate values included in the first parameter candidate value set (860).

In this case, according to an exemplary embodiment of the present disclosure, the second parameter candidate values included in the second parameter candidate value set may generated by performing an exponentiation operation using each of the plurality of first parameter candidate values included in the first parameter candidate value set as an exponent or by performing a scalar multiplication operation of a point using each of the plurality of first parameter candidate values included in the first parameter candidate value set as a scalar multiplier. In addition, at least some of the second parameter candidate values included in the second parameter candidate value set may include a value multiplied by a secret key used for encryption or digital signature generation.

In addition, according to an exemplary embodiment, the computation apparatus 100 may extract second parameter values respectively corresponding to bit strings in the plurality of generated blocks and positions of the blocks in the seed value from the second parameter candidate value set.

Thereafter, the computation apparatus 100 generates a third random number using the second parameter values (870).

According to an exemplary embodiment of the present disclosure, the computation apparatus 100 may generate the third random number by multiplying or adding the second parameter values with each other.

Meanwhile, according to an exemplary embodiment of the preset disclosure, the computation apparatus 100 may encrypt data or generate a digital signature using the generated first, second and third random numbers.

While the flowchart shown in FIG. 8 illustrates the method as being performed in a plurality of operations according to an exemplary embodiment, at least some of the operations may be performed in a different order, performed in combination with each other, omitted, performed in sub-operations, or performed with at least one operation that is not illustrated being added thereto according to another exemplary embodiment.

According to the exemplary embodiments of the present disclosure, it is possible to generate values equal to values obtained through an exponentiation operation or a scalar multiplication operation of a point using values extracted from previously generated parameter candidate value sets and an operation secure against side-channel attack, thereby improving security against a side-channel attack without degrading performance.

Methods according to various exemplary embodiments of the present disclosure described above may be embodied as an application type that may be installed in electronic devices, i.e., IoT devices.

The methods according to the various exemplary embodiments of the present disclosure described above may also be embodied by merely upgrading software or hardware of electronic devices, i.e., IoT devices.

According to an exemplary embodiment, the elements, components, methods or operations described herein may be implemented using hardware components, software components, or a combination thereof. For example, the hardware components may include a processing device. According to an exemplary embodiment, the display apparatus may include a processing device, such as the image processor or the controller, that may be implemented using one or more general-purpose or special purpose computers, such as, for example, a hardware processor, a CPU, a hardware controller, an ALU, a DSP, a microcomputer, an FPGA, a PLU, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

Meanwhile, the exemplary embodiments of the present disclosure may include a computer readable recording medium including a program for executing methods described in this specification on a computer. The computer readable recording medium may include a program instruction, a local data file, a local data structure, and/or combinations and sub-combinations thereof. The medium may be specially designed and constructed for the purpose of the present disclosure, or may be well-known and available to those having skill in the computer software arts. Examples of the computer readable recording medium include magnetic media such as a hard disk, a floppy disk, and a magnetic tape, optical media such as a compact disc read-only memory (CD-ROM) and a digital versatile disc (DVD)-ROM, magneto-optical media such as a floptical disk, and a hardware device such as ROM, random-access memory (RAM), and a flash memory, which is specially designed to store and execute program commands. Examples of the program commands include an advanced language code which the computer can execute using an interpreter as well as a machine language code made by compilers.

Each of elements according to the above-described various exemplary embodiments (e.g., modules or programs) may include a single entity or a plurality of entities, and some of corresponding sub elements described above may be omitted or other types of sub elements may be further included in the various exemplary embodiments. Alternatively or additionally, some elements (e.g., modules or programs) may be integrated into one entity and then may equally or similarly perform a function performed by each of corresponding elements that are not integrated. Operations performed by modules, programs, or other types of elements according to the various exemplary embodiments may be sequentially, in parallel, or heuristically executed or at least some operations may be executed in different sequences or may be omitted, or other types of operations may be added.

While the present disclosure has been described above in detail with reference to representative exemplary embodiments, it should be understood by those skilled in the art that the exemplary embodiments may be variously modified without departing from the scope of the present disclosure. Therefore, the scope of the present disclosure is defined not by the described exemplary embodiments but by the appended claims, and encompasses equivalents that fall within the scope of the appended claims.

What is claimed is:

1. An apparatus comprising:
a processor configured to execute:
   a seed value generator configured to generate a seed value;
   a divider configured to divide the seed value into a plurality of blocks;
   a first extractor configured to extract a plurality of first parameter values from a first parameter candidate value set comprising a plurality of first parameter candidate values, each of the plurality of first parameter values respectively corresponding to one of the plurality of blocks divided from the seed value;
   a second extractor configured to extract a plurality of second parameter values from a second parameter candidate value set comprising a plurality of second parameter candidate values generated based on the plurality of first parameter candidate values included in the first parameter candidate value set, each of the plurality of second parameter values respectively corresponding to one of the plurality of blocks divided from the seed value; and
   a calculator configured to generate a first random number based on the plurality of first parameter values, generate a second random number by performing an exponentiation operation based on the first random number as an exponent or performing a scalar multiplication operation of a point based on the first random number as a scalar multiplier, and generate a third random number based on the plurality of second parameter values,
wherein the processor is further configured to encrypt data or generate a digital signature for the data based on at least one of the first random number, the second random number, and the third random number.

2. The apparatus of claim 1, wherein each of the plurality of second parameter candidate values included in the second parameter candidate value set is generated by performing an exponentiation operation using a corresponding one of the plurality of first parameter candidate values included in the first parameter candidate value set as an exponent or by performing a scalar multiplication operation of a point using a corresponding one of the plurality of first parameter candidate values included in the first parameter candidate value set as a scalar multiplier.

3. The apparatus of claim 1, wherein
the first extractor is further configured to extract the plurality of first parameter values respectively corresponding to bit strings of the plurality of blocks divided from the seed value and positions of the blocks in the seed value from the first parameter candidate value set, and
the second extractor is further configured to extract the plurality of second parameter values respectively corresponding to bit strings in the plurality of blocks divided from the seed value and positions of the blocks in the seed value from the second parameter candidate value set.

4. The apparatus of claim 2, wherein the calculator generates the first random number by adding the plurality of first parameter values with each other.

5. The apparatus of claim 1, wherein at least one of the second parameter candidate values included in the second parameter candidate value set includes a value resulting from multiplying one of the plurality of first parameter candidate values by a secret key.

6. The apparatus of claim 5, wherein the third random number is equal to a product of the secret key and the second random number.

7. The apparatus of claim 1, wherein the processor is further configured to encrypt the data or generate the digital signature for the data based on the first random number, the second random number, and the third random number.

8. The apparatus of claim 1, wherein the seed value comprises a random bit string.

9. The apparatus of claim 1, wherein the number of the plurality of first parameter candidate values included in the first parameter candidate value set is changeable according to a length of the seed value and a number of blocks.

10. A method, comprising:
generating a seed value;
dividing the seed value into a plurality of blocks;
extracting a plurality of first parameter values from a first parameter candidate value set comprising a plurality of first parameter candidate values, each of the plurality of first parameter values respectively corresponding to one of the plurality of blocks divided from the seed value;
extracting a plurality of second parameter values from a second parameter candidate value set comprising a plurality of second parameter candidate values generated based on the plurality of first parameter candidate values included in the first parameter candidate value set, each of the plurality of second parameter values respectively corresponding to one of the plurality of blocks divided from the seed value;
generating a first random number based on the plurality of first parameter values;
generating a second random number by performing an exponentiation operation using the first random number as an exponent or by performing a scalar multiplication operation of a point using the first random number as a scalar multiplier;
generating a third random number based on the plurality of second parameter values; and
encrypting data or generating a digital signature for the data based on at least one of the first random number, the second random number, and the third random number.

11. The method of claim 10, wherein each of the plurality of second parameter candidate values included in the second parameter candidate value set is generated by performing an exponentiation operation using a corresponding one of the plurality of first parameter candidate values included in the first parameter candidate value set as an exponent or by performing a scalar multiplication operation of a point using a corresponding one of the plurality of first parameter candidate values included in the first parameter candidate value set as a scalar multiplier.

12. The method of claim 10, wherein the extracting of the plurality of first parameter values extracts the plurality of first parameter values respectively corresponding to bit strings of the plurality of blocks divided from the seed value and positions of the blocks in the seed value from the first parameter candidate value set, and
the extracting the plurality of second parameter values extracts the plurality of second parameter values respectively corresponding to bit strings in the plurality of blocks divided from the seed value and positions of the blocks in the seed value from the second parameter candidate value set.

13. The method of claim 11, wherein the generating of the first random number generates the first random number by adding the plurality of first parameter values with each other.

14. The method of claim 10, wherein at least one of the second parameter candidate values included in the second parameter candidate value set includes a value resulting from multiplying one of the plurality of first parameter candidate values by a secret key.

15. The method of claim 14, wherein the third random number is equal to a product of the secret key and the second random number.

16. The method of claim 10, wherein the encrypting the data or the generating the digital signature for the data is based on at least one of the first random number, the second random number, and the third random number.

17. The method of claim 10, wherein the seed value comprises a random bit string.

18. The method of claim 10, wherein the number of the plurality of first parameter candidate values included in the first parameter candidate value set is changeable according to a length of the seed value and a number of blocks.

19. A non-transitory computer readable medium having stored thereon a program for causing a computer to execute a method of claim 10.

20. An apparatus comprising:
a processor configured to:
receive a seed value;
divide the seed value into a plurality of blocks;
extract, for each of the plurality of blocks, a first parameter value from a first parameter candidate value set comprising a plurality of first parameter candidate values, by using a number of the respective block and a value in the respective block as a first index;

extract, for each of the plurality of blocks, a second parameter value from a second parameter candidate value set comprising a plurality of second parameter candidate values generated based on the plurality of first parameter candidate values, by using a number of the respective block and a value in the respective block as a second index, the plurality of second parameter values;

generate a first random number based the first parameter values for each of the plurality of blocks;

generate a second random number by performing one of an exponentiation operation based on the first random number as an exponent or a scalar multiplication operation of a point based on the first random number as a scalar multiplier;

generate a third random number based on the second parameter values; for each of the plurality of blocks; and apply at least one of the first random number, the second random number, and the third random number to encrypt data or generate a digital signature for the data.

21. The apparatus of claim 20, wherein a number of the first parameter candidate values included in the first parameter candidate value set or a number of the second parameter candidate values included in the second parameter candidate value set changes according to a length of the seed value and a total number of the plurality of blocks.

* * * * *